(12) United States Patent
Nagase et al.

(10) Patent No.: US 8,584,076 B2
(45) Date of Patent: Nov. 12, 2013

(54) PRINTED CIRCUIT BOARD DESIGN ASSISTING DEVICE, METHOD, AND PROGRAM

(75) Inventors: Kenji Nagase, Kawasaki (JP); Yoshihiro Sawada, Kawasaki (JP); Yoshiaki Hiratsuka, Kawasaki (JP); Tomoyuki Nakao, Kawasaki (JP); Keisuke Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/238,613

(22) Filed: Sep. 21, 2011

(65) Prior Publication Data

US 2012/0079443 A1 Mar. 29, 2012

(30) Foreign Application Priority Data

Sep. 29, 2010 (JP) ................................ 2010-218146

(51) Int. Cl.
*G06F 17/50* (2006.01)
(52) U.S. Cl.
USPC ........................................................ 716/137
(58) Field of Classification Search
USPC ........................................................ 716/137
See application file for complete search history.

(56) References Cited

U.S. PATENT DOCUMENTS

| | | | |
|---|---|---|---|
| 7,409,665 B2 | 8/2008 | Fusayasu et al. | |
| 2003/0016519 A1* | 1/2003 | Bachman | 361/818 |
| 2003/0102549 A1* | 6/2003 | Lin | 257/690 |
| 2006/0124348 A1* | 6/2006 | Wang et al. | 174/255 |
| 2007/0044062 A1* | 2/2007 | Fusayasu et al. | 716/15 |
| 2008/0102701 A1* | 5/2008 | Suzuki et al. | 439/608 |
| 2009/0308649 A1* | 12/2009 | Cases et al. | 174/261 |

FOREIGN PATENT DOCUMENTS

| | | |
|---|---|---|
| JP | 2005-223120 | 8/2005 |
| JP | 2007-26390 | 2/2007 |
| JP | 2009-54648 | 3/2009 |

* cited by examiner

*Primary Examiner* — Jack Chiang
*Assistant Examiner* — Mohammed Alam
(74) *Attorney, Agent, or Firm* — Staas & Halsey LLP

(57) ABSTRACT

A printed circuit board design assisting device includes a frame ground extraction section that extracts a ground pattern that is provided in a surface layer of a printed circuit board and that is to be connected to a metal component from design data on the printed circuit board stored in a design data storage section to store information for specifying the ground pattern in a data storage section, an electrostatic discharge determination section that performs a determination as to electrostatic discharge for the ground pattern specified from the information stored in the data storage section to store a determination result in a determination result storage section, and an output section that outputs the determination result stored in the determination result storage section.

11 Claims, 24 Drawing Sheets

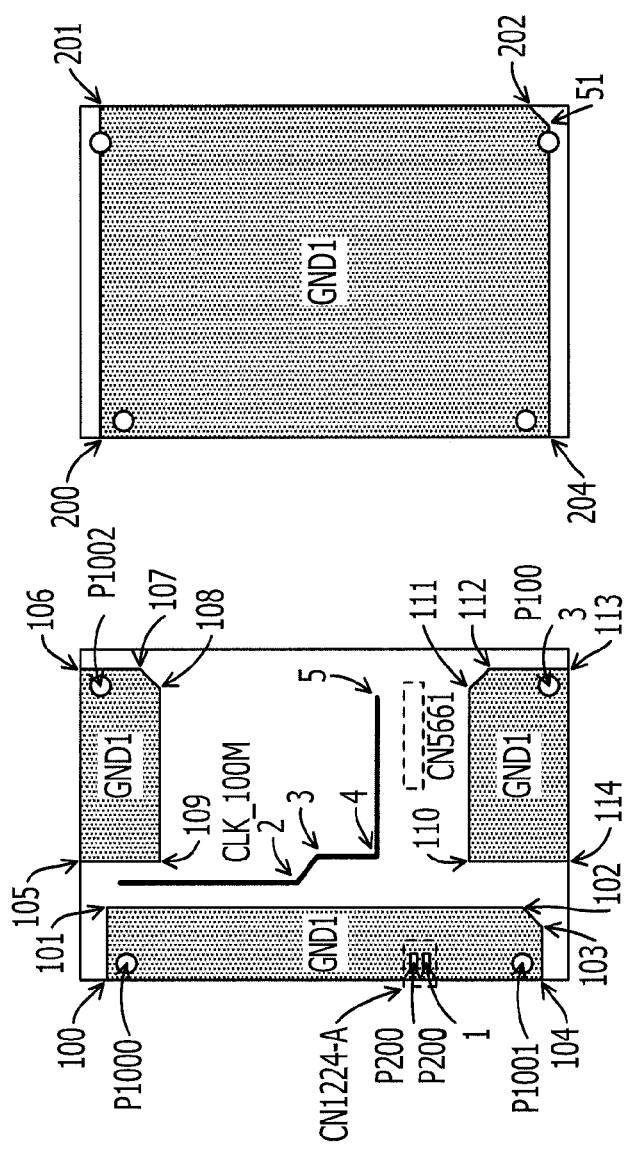

FIG. 3

| NET NAME | CONFIGURATION | LAYER INFORMATION | TYPE | CATEGORY |
|---|---|---|---|---|
| CLK_100M | p1(x1,y1), p2(x2,y2), W4 | L1 | LINE | SIGNAL |
| CLK_100M | p2(x2,y2), p3(x3,y3), W5 | L1 | LINE | SIGNAL |
| CLK_100M | p3(x3,y3), p4(x4,y4), W6 | L1 | LINE | SIGNAL |
| CLK_100M | p4(x4,y4), p5(x5,y5), W7 | L1 | LINE | SIGNAL |
| 3.3V_VCC | p50(x50,y50), p51(x51,y51), p52(x52,y52), p53(x53,y53), p54(x54,y54) | L5 | AREA | POWER SUPPLY |
| 5.0V_VCC | p55(x55,y55), p56(x56,y56), p57(x57,y57), p58(x58,y58), p59(x59,y59) | L5 | AREA | POWER SUPPLY |
| GND1 | p100(x100,y100), p101(x101,y101), p102(x102,y102), p103(x103,y103), p104(x104,y104) | L1 | AREA | GND |
| GND1 | p105(x105,y105), p106(x106,y106), p107(x107,y107), p108(x108,y108), p109(x109,y109) | L1 | AREA | GND |
| GND1 | p110(x110,y110), p111(x111,y111), p112(x112,y112), p113(x113,y113), p114(x114,y114) | L1 | AREA | GND |
| GND1 | p200(x200,y200), p201(x201,y201), p202(x202,y202), p203(x203,y203), p204(x204,y204) | L2 | AREA | GND |

FIG. 4

| HOLE CATEGORY | CONFIGURATION | LAYER INFORMATION | TYPE |
|---|---|---|---|
| CIRCULAR | p1000(x1000, y1000), R0 | ALL LAYERS | THROUGH |
| CIRCULAR | p1001(x1001, y1001), R1 | ALL LAYERS | THROUGH |
| CIRCULAR | p1002(x1002, y1002), R2 | ALL LAYERS | THROUGH |
| CIRCULAR | p1003(x1003, y1003), R3 | ALL LAYERS | THROUGH |
| RECTANGULAR | p2000(x2000, y2000), W0, D0 | ALL LAYERS | THROUGH |
| RECTANGULAR | p2001(x2001, y2001), W1, D1 | ALL LAYERS | THROUGH |

FIG. 5

| MODEL NAME | CONFIGURATION (CENTER COORDINATES) | LAYER INFORMATION |
|---|---|---|
| CN1224-A | p3000(x3000, y3000),W2,D2 | L1 |
| CN5661 | p3001(x3001, y3001),W3,D3 | L1 |

FIG. 9

| SPRING CONNECTOR |
|---|
| CN1224-A |
| CN1236-A |
| CN4662-A |

FIG. 10

| MODEL NAME | WITH OR WITHOUT SPRING |
|---|---|
| CN1224-A | WITH SPRING |
| CN5661 | WITHOUT SPRING |

FIG. 13

| LENGTH OF SIDE a | LENGTH OF SIDE b | |
|---|---|---|
| 0.1 mm OR MORE | 0.1 mm OR MORE | TO BE CHECKED; TWO SIDES ARE 0.1 mm OR LONGER |
| 0.1 mm OR MORE | LESS THAN 0.1 mm | TO BE CHECKED; ONE SIDE IS 0.1 mm OR LONGER |
| LESS THAN 0.1 mm | 0.1 mm OR MORE | TO BE CHECKED; ONE SIDE IS 0.1 mm OR LONGER |
| LESS THAN 0.1 mm | LESS THAN 0.1 mm | NOT TO BE CHECKED; TWO SIDES ARE SHORTER THAN 0.1 mm |

FIG. 14

☐ FG INTERNAL ANGLE CHECK  [ 85.000° ]  DETECT ANGLE EQUAL TO OR LESS THAN 85.000°

[ 0.100mm ]  SIDES EQUAL TO OR LONGER THAN 0.100 mm ARE TO BE CHECKED

FIG. 16

☐ FG-SIGNAL PATTERN GAP CHECK    MINIMUM GAP SIZE  2.000mm

PRINTED CIRCUIT BOARD DESIGN ASSISTING DEVICE, METHOD, AND PROGRAM

CROSS-REFERENCE TO RELATED APPLICATIONS

This application is based upon and claims the benefit of priority of the prior Japanese Patent Application No. 2010-218146, filed on Sep. 29, 2010, the entire contents of which are incorporated herein by reference.

FIELD

The embodiments discussed herein are related to a device and a method that assist in designing a printed circuit board.

BACKGROUND

Electric devices and electronic devices are required to provide electromagnetic non-interference and tolerance (Electromagnetic Compatibility (EMC)). For example, when an electrostatic voltage is applied to a metal portion, such as a connector, exposed to a surface of an electronic device, noise due to the voltage propagates through the metal portion of the device and enters a printed circuit board to cause an erroneous operation. CISPR 24, which is an international standard for information devices, requires that the devices should operate normally when a voltage of 4 kV is applied through contact discharge and a voltage of 8 kV is applied through aerial discharge in an Electrostatic Discharge (ESD) test.

For the electromagnetic tolerance, for example, there is provided a technology for checking ESD tolerance by specifying a location of application of static electricity and comparing the distance from the specified location to a printed circuit board and the distance from the specified location to a metal structure provided to conduct the static electricity to the earth.

For the electromagnetic non-interference, there are provided technologies for checking Electromagnetic Interference (EMI). For example, in one technology, information on wiring of a printed circuit board is referenced to check whether a guard ground, which is a guard pattern of a ground attribute, is provided within a prescribed distance from a signal pattern. In another technology, it is checked whether a ground plane for preventing noise for a signal pattern and a bypass capacitor for preventing noise for a power supply are not connected to each other.

In recent years, for the electronic devices such as cellular phones and personal computers, in particular, the component mounting density has become higher, the material of housing components has been changed from a metal to a resin, and the structure of semiconductor devices has been changed along with size and weight reductions, an increase in speed, and a reduction in power consumption, and the ESD tolerance has been lowered accordingly.

Previously, the ESD tolerance was successfully improved by making modifications to the housing etc. in the device prototype stage. However, housings with a reduced size and printed circuit boards with a reduced mounting area do not allow such modifications, and it is difficult to improve the ESD tolerance in the same way as in the related art. Thus, it is preferable to take ESD measures in the printed circuit board design stage. However, there has not been provided any technology that allows specifying from design data on the printed circuit board a location that may be problematic from the viewpoint of ESD measures.

SUMMARY

According to an embodiment, a printed circuit board design assisting device includes a frame ground extraction section that extracts a ground pattern that is provided in a surface layer of a printed circuit board and that is to be connected to a metal component from design data on the printed circuit board stored in a design data storage section to store information for specifying the ground pattern in a data storage section, an electrostatic discharge determination section that performs a determination as to electrostatic discharge for the ground pattern specified from the information stored in the data storage section to store a determination result in a determination result storage section, an output section that outputs the determination result stored in the determination result storage section.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A to 2C illustrate a multi-layer circuit board according to an embodiment;

FIG. 3 illustrates a pattern table stored in a design data storage section;

FIG. 4 illustrates a hole table stored in the design data storage section;

FIG. 5 illustrates a connector table stored in the design data storage section;

FIG. 9 illustrates a list of spring connectors stored in a spring connector storage section;

FIG. 10 illustrates a connector table stored in the design data storage section with additional information on the presence or absence of a spring;

FIG. 13 illustrates a determination as to whether an internal angle between two sides with various combinations of lengths is to be checked;

FIG. 14 illustrates a screen for setting parameters for a FRAME GROUND internal angle check;

FIG. 16 illustrates a screen for setting a parameter for the FRAME GROUND-signal pattern gap check;

DESCRIPTION OF EMBODIMENTS

Figure 1:
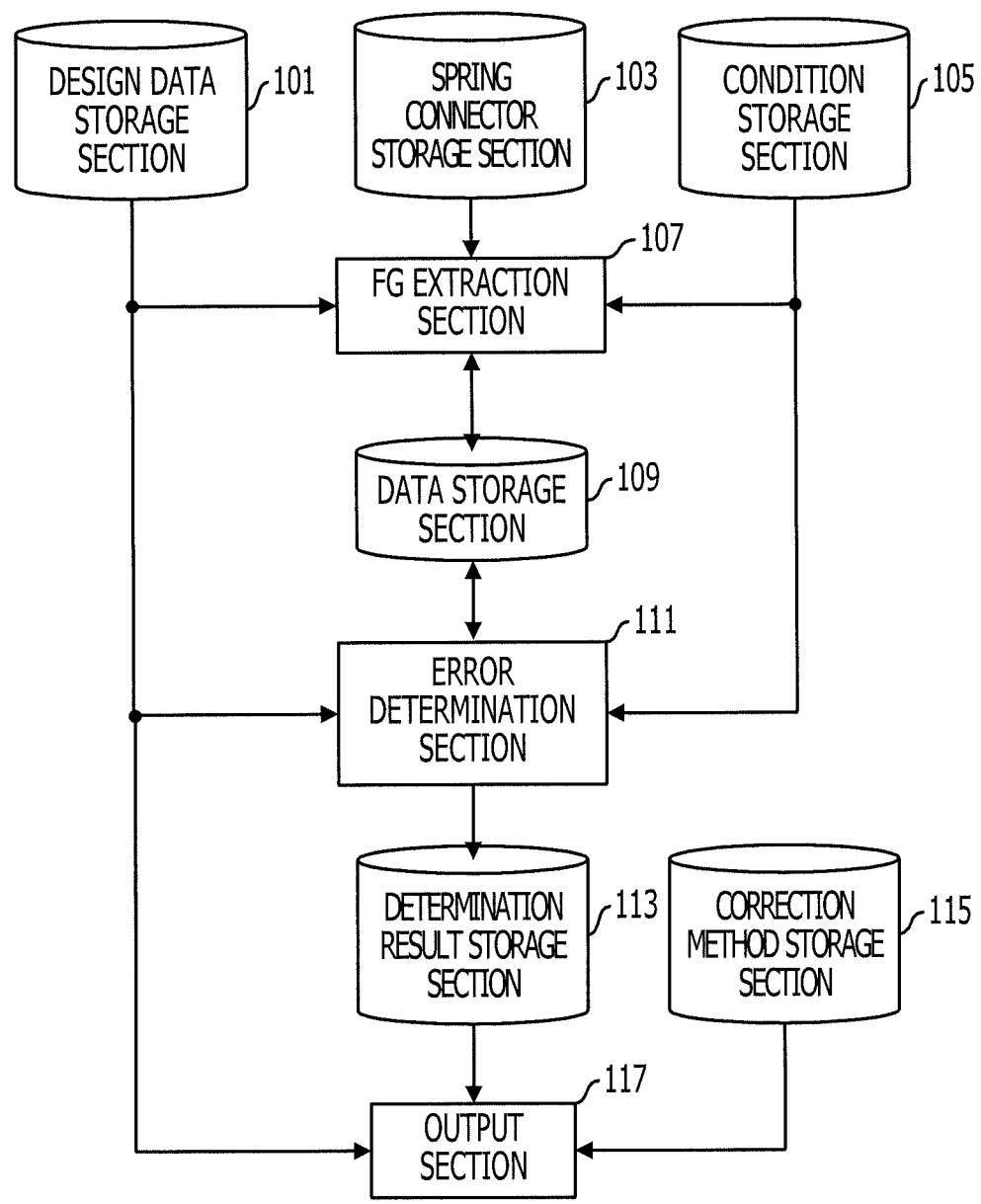
FIG. 1 is a functional block diagram of a printed circuit board design assisting device.

FIG. 1 is a functional block diagram of a printed circuit board design assisting device according to an embodiment. The printed circuit board design assisting device according to the embodiment includes a design data storage section 101 that stores design data generated by a CAD (Computer Aided Design) system, a spring connector storage section 103 that stores a list of spring connectors, a condition storage section 105 that stores parameters for use in extraction of a frame ground and determination of an error, a frame ground extraction section 107, a data storage section 109, an error determination section 111, a determination result storage section 113, a correction method storage section 115 that stores correction methods corresponding to the categories of errors etc., and an output section 117.

The FRAME GROUND extraction section 107 extracts a FRAME GROUND from the design data using data stored in the design data storage section 101, the spring connector storage section 103, and the condition storage section 105 to store data for specifying the FRAME GROUND in the data storage section 109. The error determination section 111 determines whether there is any problem with the design data using data stored in the design data storage section 101, the condition storage section 105, and the data storage section 109 to store data for specifying a location determined as an error and data indicating the category of the error in the determination result storage section 113. The output section 117 outputs the location determined as an error, a correction method, etc., using data stored in the design data storage section 101, the determination result storage section 113, and the correction method storage section 115.

Next, the content of the processes performed by the printed circuit board design assisting device illustrated in FIG. 1 will be described with reference to FIGS. 2A to 2C and 21. The design data storage section 101 stores design data on a printed circuit board in advance. FIGS. 2A to 2C illustrate a schematic example of the printed circuit board to be processed. FIGS. 2A to 2C illustrate a multi-layer circuit board with a total of five layers. Third and fourth layers are not illustrated. For such a printed circuit board, data illustrated in FIGS. 3 to 5 are stored in the design data storage section 101.

FIG. 3 illustrates an example of a pattern table stored in the design data storage section 101. The pattern table has columns for net name, configuration, layer information, type, and category. In the net name field, the name for identification of a net indicating a connection between terminals of components is registered. As illustrated in FIG. 3, a plurality of patterns may belong to the same net. In the configuration field, information for specifying the shape of each pattern is registered. For example, for a line pattern, the coordinates of the start and end points of the line and the width of the line are registered. For an area pattern, the coordinates of the vertexes defining the area are registered in the order of connection. In the layer information field, information for specifying which layer the pattern is provided in is registered. For example, "L1" indicates the first layer, and "L2" indicates the second layer. In the type field, the type indicating the shape of the pattern is registered. Examples of the type include "line" and "area". In the category field, the category indicating the use of the pattern is registered. Examples of the category include "signal", "power supply", and "ground (GND)".

FIG. 4 illustrates an example of a hole table stored in the design data storage section 101. The hole table has columns for hole category, configuration, layer information, and type. In the hole category field, the category indicating the shape of the hole such as "circular" and "rectangular" is registered. In the configuration field, information for specifying the shape of the hole is registered. For example, for a circular hole, the center coordinates and the radius are registered in the configuration field. For a rectangular hole, the center coordinates and the vertical and horizontal lengths are registered in the configuration field. In the layer information field, information on the layer in which the hole is provided is registered. In the type field, the type of the hole such as "through" or "bottomed" is registered. In case of a bottomed hole, the depth of the hole may be stored in the configuration column.

FIG. 5 illustrates an example of a connector table stored in the design data storage section 101. The connector table has columns for model name, configuration, and layer information. In the model name field, the name identifying the model of the connector is registered. In the configuration field, the center coordinates of the position at which the connector is disposed and the vertical and horizontal lengths of the connector are registered. In the layer information field, information for specifying the layer in which the connector is disposed is registered.

Figure 6:
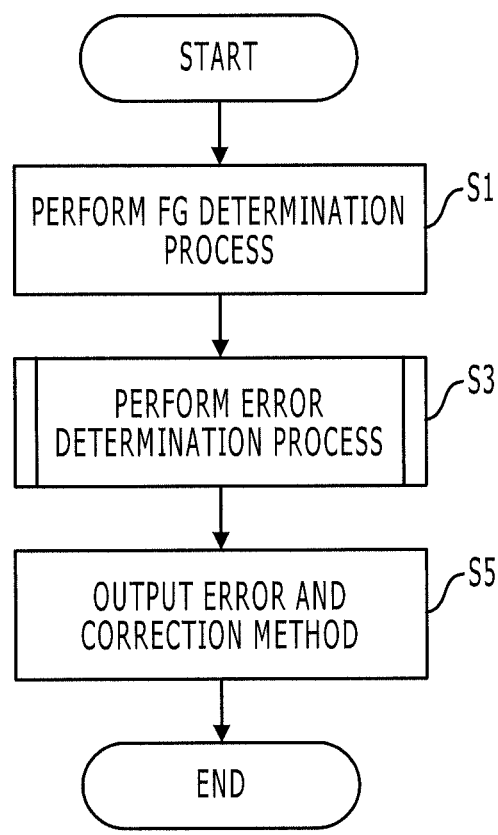
FIG. 6 illustrates a printed circuit board design assisting process.

The process performed using such design data will be described with reference to FIGS. 6 to 21. First, the FRAME GROUND extraction section 107 performs a frame ground determination process (FIG. 6: step S1). The FRAME GROUND determination process will be described with reference to FIGS. 7 to 10.

Figure 7:
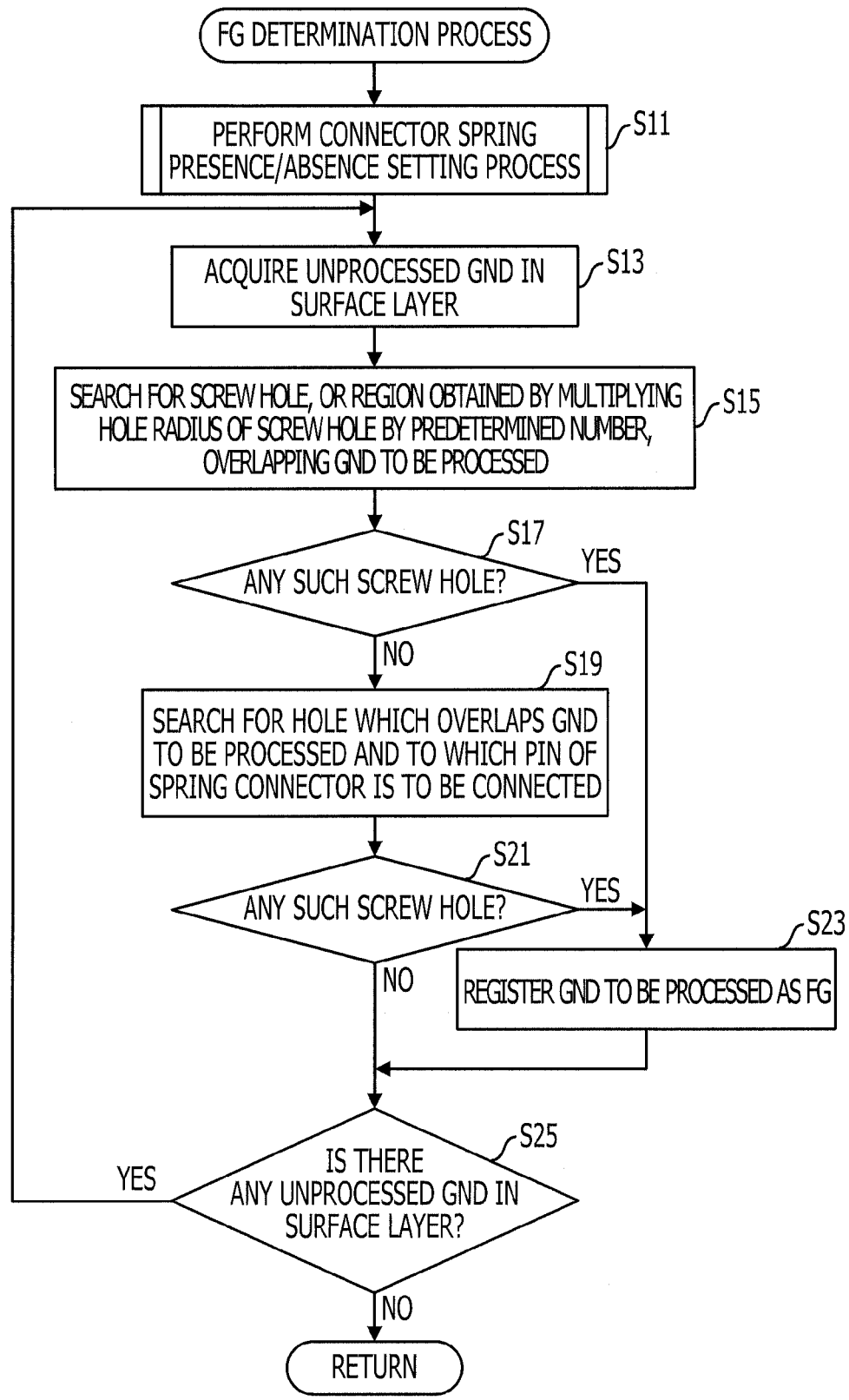
FIG. 7 illustrates a frame ground determination process.

The FRAME GROUND extraction section 107 performs a connector spring presence/absence setting process (FIG. 7: step S11). The connector spring presence/absence setting process will be described with reference to FIGS. 8 and 9.

Figure 8:
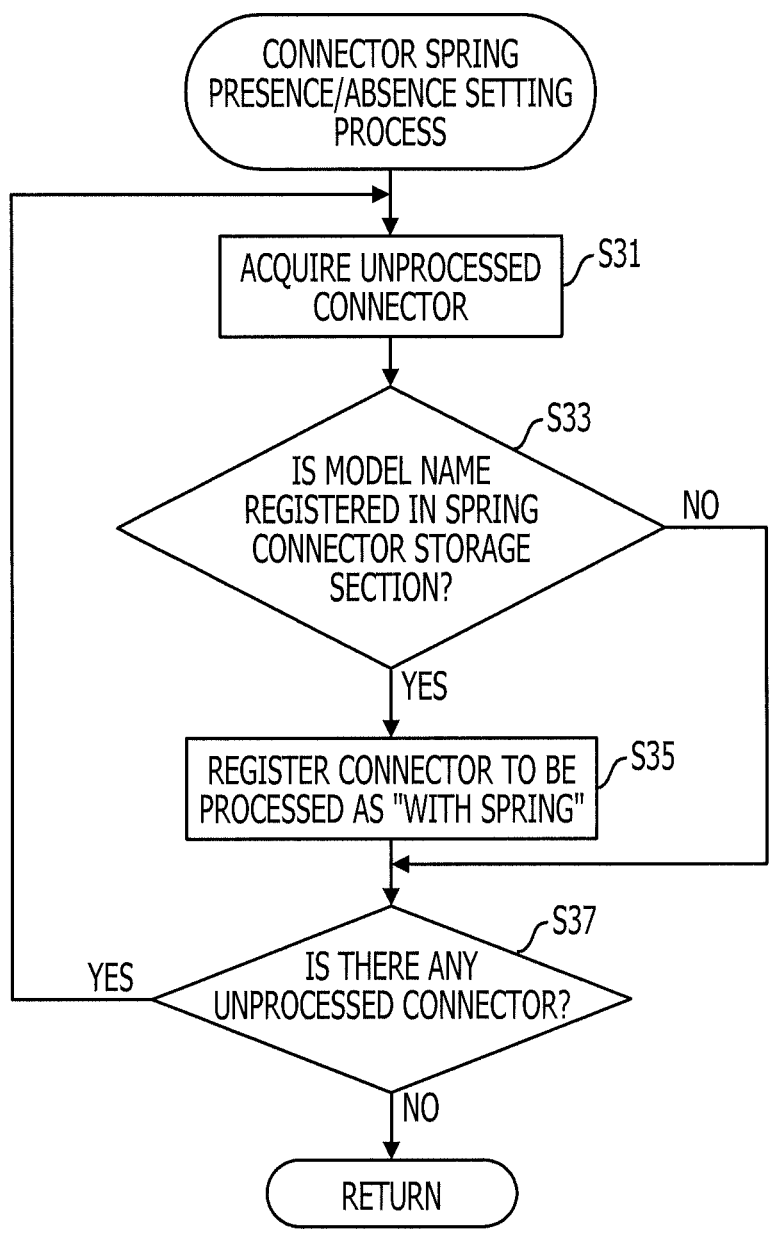
FIG. 8 illustrates a connector spring presence/absence setting process.
Figure 11:
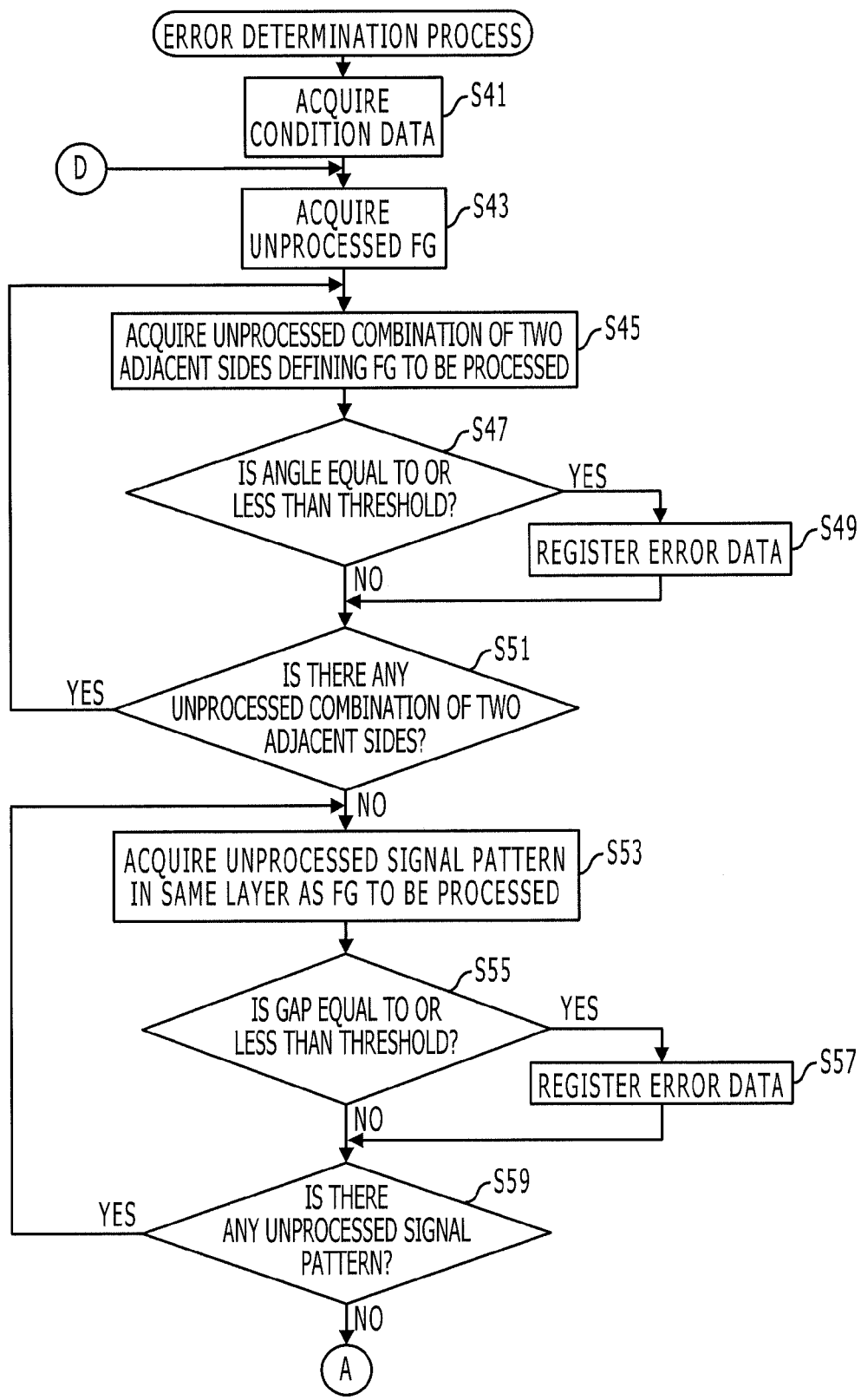
FIG. 11 illustrates an error determination process.

First, the FRAME GROUND extraction section 107 acquires one unprocessed connector from the connector table in the design data storage section 101 to store the acquired unprocessed connector in the data storage section 109 (FIG. 8: step S31). Then, the FRAME GROUND extraction section 107 searches the list of spring connectors stored in the spring connector storage section 103 to judge whether the model name of the connector to be processed is registered (step S33).

The spring connector storage section 103 stores a list of the model names of spring connectors such as that illustrated in FIG. 9, for example. Spring connectors include a spring-like member made of a metal. ESD noise can be dissipated to a housing by causing the spring-like member to contact the housing, a shield metal plate on a surface of a device at the same potential as the housing, or the like when the connector is assembled to the device. In the case where the model name of the connector to be processed is included in the list of spring connectors, the FRAME GROUND extraction section 107 registers the connector to be processed as "with spring" in the data storage section 109 (step S35). For example, as illustrated in FIG. 10, data indicating "without spring" are initially registered for the connectors registered in the connector table, and data indicating "with spring" are registered for the connector to be processed. A column indicating "with or without spring" may be added to the connector table illustrated in FIG. 5.

In the case where it is judged in step S33 that the model name of the connector to be processed is not registered in the list of spring connectors, or after step S35, the FRAME GROUND extraction section 107 judges whether there is any unprocessed connector in the design data storage section 101 (step S37). In the case where there is any unprocessed connector, the process returns to step S31. In the case where there is no unprocessed connector, the FRAME GROUND determination process is terminated to return to the process in FIG. 7.

Returning to the description of the process in FIG. 7, the FRAME GROUND extraction section 107 acquires one unprocessed ground pattern in a surface layer from the pattern table in the design data storage section 101 (FIG. 7: step S13). Specifically, the FRAME GROUND extraction section 107 acquires one unprocessed pattern, the layer information of which indicates a surface layer (in the embodiment, the first layer or the fifth layer) and the category of which is "GND". Then, the FRAME GROUND extraction section 107 judges whether a screw hole registered in the hole table in the design data storage section 101 meets a condition that a region having the same center as the center of the screw hole and having a radius obtained by multiplying the radius of the screw hole by a predetermined number overlaps the ground pattern to be processed (step S15).

For example, a screw hole that meets conditions that the hole has a radius within a predetermined range and that the hole is a circular hole penetrating through all the layers can be extracted from the hole table. Then, it is judged whether a region centered on the same coordinates as the center coordinates of the hole registered in the hole table and having a radius obtained by multiplying the radius of the hole by a predetermined number overlaps the ground pattern specified from information from the pattern table. Here, it is judged whether at least one of the holes registered in the hole table meets the conditions. Specifically, it is judged that a screw hole meets the above conditions either in the case where the center of the screw hole is located inside the ground pattern to be processed or in the case where the distance between the center of the screw hole and a side of the ground pattern to be processed that is the closest to the center of the screw hole is equal to or less than a length obtained by multiplying the radius of the screw hole by a predetermined number.

A surrounding portion of the region having the same center as the center of the screw hole and having a radius obtained by multiplying the radius of the screw hole by a predetermined number excluding the screw hole itself is contacted by the head portion of a screw, a washer, or the like when the screw is fastened. In general, the head portion of a screw contacts a region centered on the screw hole obtained by multiplying the radius of the screw hole by 1.4. For parameters such as the range of the radius as a condition for a screw hole and a coefficient for use to multiply the radius by a predetermined number, user set values may be stored in advance in the condition storage section 105 to be read and used by the FRAME GROUND extraction section 107. In the case where the ground pattern and the screw are to be connected to each other, the ground pattern is to be connected to the housing via the screw, a spacer, or the like.

In the case where it is judged that there is any such screw hole that the region having the same center as the center of the screw hole and having a radius obtained by multiplying the radius of the screw hole by a predetermined number overlaps the ground pattern to be processed (step S17: Yes route), the process proceeds to step S23. In the case where it is judged that there is no such screw hole (step S17: No route), on the other hand, the FRAME GROUND extraction section 107 judges whether there is any hole that is to be connected to a lead pin of a spring connector and that overlaps the ground pattern to be processed in the hole table in the design data storage section 101 (step S19).

First, spring connectors can be specified in accordance with whether or not data indicating "with spring" are registered for the connectors registered in the connector table in the design data storage section 109. Meanwhile, holes to which a lead pin of a spring connector is to be connected can be specified as holes provided in a region in which a spring connector is disposed on the basis of regions in which the connectors are disposed registered in the connector table and regions of the holes registered in the hole table. Then, it is judged whether or not the holes to which a lead pin of a spring connector is to be connected overlap the ground pattern to be processed to judge whether there is any hole that meets the conditions of step S19. Here, it is judged whether at least one of the connectors with data indicating "with spring" registered in the data storage section 109 meets the conditions. It is also possible to first extract holes overlapping the ground pattern to be processed and then judge whether the extracted holes are to be connected to a spring connector. In the case where the ground pattern and the spring connector are to be connected to each other, the ground pattern is to be connected to the housing via the spring connector.

In the case where it is judged in step S17 or step S21 that there is any hole that meets the conditions, the FRAME GROUND extraction section 107 registers the ground pattern to be processed in a list of FRAME GROUNDs in the data storage section 109. For example, information similar to the information in the pattern table illustrated in FIG. 3 may be registered in the list of FRAME GROUNDs. A flag indicating that the ground pattern is a FRAME GROUND may be added to the pattern table.

In the case where it is judged in step S21 that there is no hole that meets the conditions, or after step S23, the FRAME GROUND extraction section 107 judges whether there is any unprocessed ground pattern in a surface layer in the pattern table in the design data storage section 101 (step S25). In the case where there is any unprocessed ground pattern in a surface layer, the process returns to step S13. In the case where there is no unprocessed ground pattern in a surface layer, on the other hand, the FRAME GROUND determination process is terminated to return to the process in FIG. 6.

Returning to the description of the process in FIG. 6, the error determination section 111 performs an error determination process (step S3). The error determination process will be described with reference to FIGS. 11 to 21.

First, the error determination section 111 acquires parameters for use in the error determination process from the condition storage section 105 (step S41). For example, parameters for use in subsequent processes such as the internal angle of a FRAME GROUND to be determined as an error, the length of sides to be checked, the distance between a FRAME GROUND and a signal pattern to be determined as an error, a parameter for specifying the range in which a screw hole should be provided from a corner of a FRAME GROUND, and the interval at which screw holes should be disposed along an edge of a FRAME GROUND. Then, the error determination section 111 acquires one unprocessed FRAME GROUND from the list of FRAME GROUNDs stored in the data storage section 109 (step S43). Here, data on the FRAME GROUND with the data structure illustrated in FIG. 3 are acquired.

Next, the error determination section 111 extracts an unprocessed combination of two adjacent sides from the coordinates of the vertexes defining the shape of the acquired FRAME GROUND (step S45). Then, the error determination section 111 judges whether the length of at least one of the two sides is equal to or more than the length of sides to be checked acquired in step S41 and whether the internal angle between the two sides is equal to or less than the internal angle of a FRAME GROUND to be determined as an error acquired in step S41 (step S47).

Here, the internal angle of a FRAME GROUND to be determined as an error is set to 85 degrees, for example. A strong electric field tends to be produced at a pointed portion (in the embodiment, a portion at an angle of 85 degrees or less) included in the shape of a FRAME GROUND, and a dielectric breakdown may be caused at the pointed portion. The internal angle of a FRAME GROUND to be determined as an error is a parameter for use to judge whether there is any such pointed portion. Meanwhile, the length of sides to be checked is set to 0.1 mm, for example. On a printed circuit board, successive short sides may form an arc-like shape. The length of sides to be checked is a parameter for narrowing locations for error determination by excluding angles between two sides with a length less than a predetermined length.

Figure 12A:
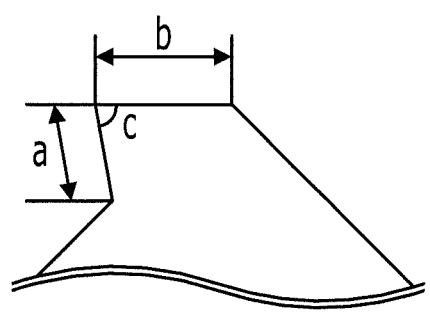
FIGS. 12A and 12B illustrate an error determination for an internal angle.
Figure 12B:
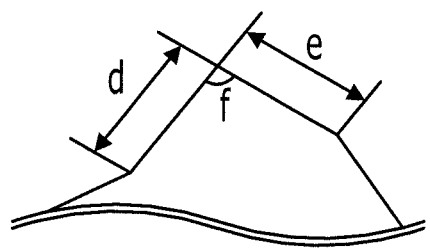

Next, this determination will be described with reference to FIGS. 12A, 12B, and 13. In FIG. 12A, angle c is 85 degrees or less. In this case, if side a or side b has a length of 0.1 mm or more, angle c is determined as an error. If sides a and b have a length less than 0.1 mm, angle c is not determined as an error. FIG. 13 summarizes whether or not an internal angle between sides a and b with various combinations of lengths is to be checked. In FIG. 12B, on the other hand, angle f is more than 85 degrees. In this case, it is decided whether or not angle f is to be checked in accordance with the combination of the lengths of sides d and e as in FIG. 13. Since angle f is more than 85 degrees, however, angle f is not determined as an error irrespective of the lengths of sides d and e.

An error determined in this step is typically attributable to a designer, but may not be attributable to the designer. For example, some printed circuit board design systems have a function of automatically changing the shape of a ground pattern when the designer draws a wiring pattern such that the wiring pattern and the ground pattern are not connected to each other. Even in the case where a portion of the ground pattern is changed into a pointed shape by such a function, a problematic portion can be specified by performing the determination as described above. In addition, shapes that could only be observed by the designer through enlarged display of the design data can be easily verified by making a determination on the basis of the coordinates registered in the pattern table.

The internal angle of a FRAME GROUND to be determined as an error and the length of sides to be checked may be set in advance by the user using an input screen such as that illustrated in FIG. 14, for example.

Then, in the case where it is determined that the combination to be processed meets the conditions of step S47, the error determination section 111 registers error data in the determination result storage section 113 (step S49). Here, layer information for specifying the layer in which the FRAME GROUND to be processed is provided, the coordinates of three points for specifying the two sides related to the combination to be processed, and the error category are stored, for example. As the error category, data for specifying the category of this error determination are registered. For this error determination, data such as "internal angle check" are registered, for example. The registered data are subsequently used to present the location of the error, a correction method, etc. Data with the data structure illustrated in FIG. 3 may be registered to present the FRAME GROUND itself, or the coordinates of the intersection point of the two sides related to the combination to be processed may be registered and a search may be performed around the registered coordinates in the pattern table in the design data storage section 101 or the like to present the location of the error.

In the case where it is determined that the combination to be processed does not meet the conditions of step S47, or after step S49, the error determination section 111 judges whether there is any unprocessed combination of two adjacent sides (step S51). In the case where there is any unprocessed combination, the process returns to step S45.

In the case where it is judged that there is no unprocessed combination, on the other hand, the error determination section 111 acquires one unprocessed signal pattern that is provided in the same layer as the FRAME GROUND to be processed from the pattern table in the design data storage section 101 (step S53). Here, a pattern (including a via, a land, a pad, and so forth) that has the same layer information as the FRAME GROUND to be processed and that is in the "signal" category is acquired. Then, the error determination section 111 judges whether the gap between the FRAME GROUND and the signal pattern is equal to or less than the distance between a FRAME GROUND and a signal pattern to be determined as an error acquired in step S41 (step S55). Here, the distance between a FRAME GROUND and a signal pattern to be determined as an error is set to 2.0 mm, for example.

Figure 15:
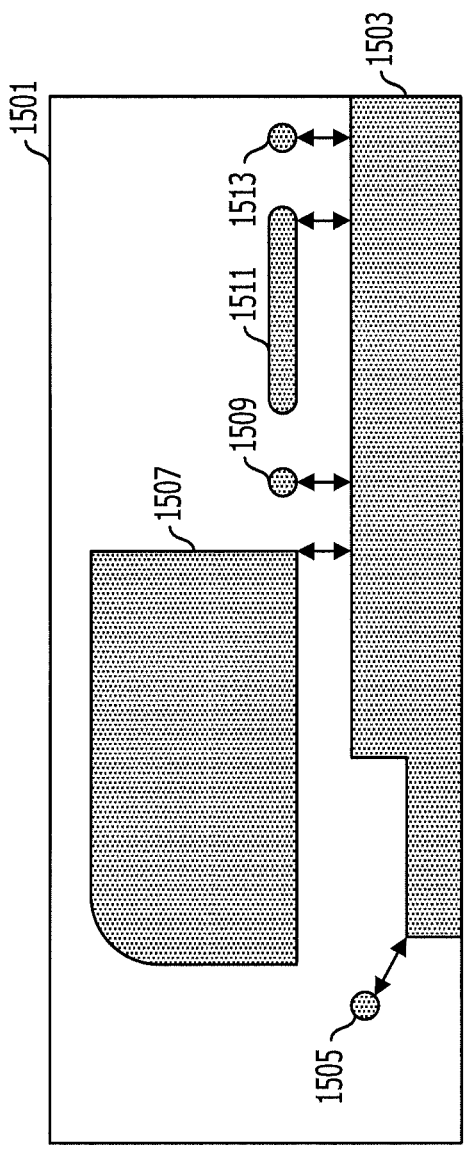
FIG. 15 illustrates a FRAME GROUND-signal pattern gap check.

This step will be specifically described with reference to FIG. 15. FIG. 15 illustrates a printed circuit board 1501, a FRAME GROUND 1503, a pad 1505, an area pattern 1507, a via 1509, a line pattern 1511, and a land 1513. The category for the area pattern 1507, the via 1509, the line pattern 1511, and the land 1513 registered in the pattern table is "signal". A search is performed in such a printed circuit board 1501 for a gap with the smallest size between a side of the FRAME GROUND 1503 and a side defining the outer shape of each signal pattern, and it is judged whether the smallest gap size is equal to or less than 2.0 mm.

If a signal pattern is provided near a FRAME GROUND on a printed circuit board, ESD noise propagated through the FRAME GROUND may affect the signal pattern. Thus, in the case where it is judged in this step that the signal pattern is provided at a distance of a predetermined value or less from the FRAME GROUND, the FRAME GROUND or the signal pattern is determined as an error. The distance between a FRAME GROUND and a signal pattern determined as an error may be set in advance by the user using an input screen such as that illustrated in FIG. 16, for example. For the pad 1505, the via 1509, and the land 1513, the identification name, the configuration (center coordinates, radius, vertical and horizontal lengths, etc.), the layer information, the category (such as "signal"), etc., may be registered in a table that is separate from the pattern table.

Then, in the case where it is judged that the gap between the FRAME GROUND and the signal pattern is a predetermined value or less, the error determination section 111 registers error data in the determination result storage section 113 (step S57). Here, layer information for specifying the layer in which the FRAME GROUND to be processed is provided, information indicating the coordinates of the portion determined as an error, and the error category are stored, for example. For the error category, data such as "gap check" are registered, for example. For the information indicating the coordinates of the portion determined as an error, the coordinates of one or both of the FRAME GROUND to be processed and the signal pattern may be registered, for example. Alternatively, the start and end points of the line segment indicating the smallest gap size may be registered. This error may be considered as an error of the FRAME GROUND or an error of the signal pattern, and can be resolved by correcting either the FRAME GROUND or the signal pattern.

In the case where it is judged in step S55 that the gap between the FRAME GROUND and the signal pattern is not equal to or less than a predetermined value, or after step S57, the error determination section 111 judges whether there is any unprocessed signal pattern that has the same layer information as the FRAME GROUND to be processed and that is in the "signal" category in the pattern table in the design data storage section 101 (step S59). In the case where it is judged that there is any unprocessed signal pattern, the process returns to step S53. In the case where it is judged that there is no unprocessed signal pattern, on the other hand, the process proceeds to FIG. 17 via a terminal A.

Figure 17:
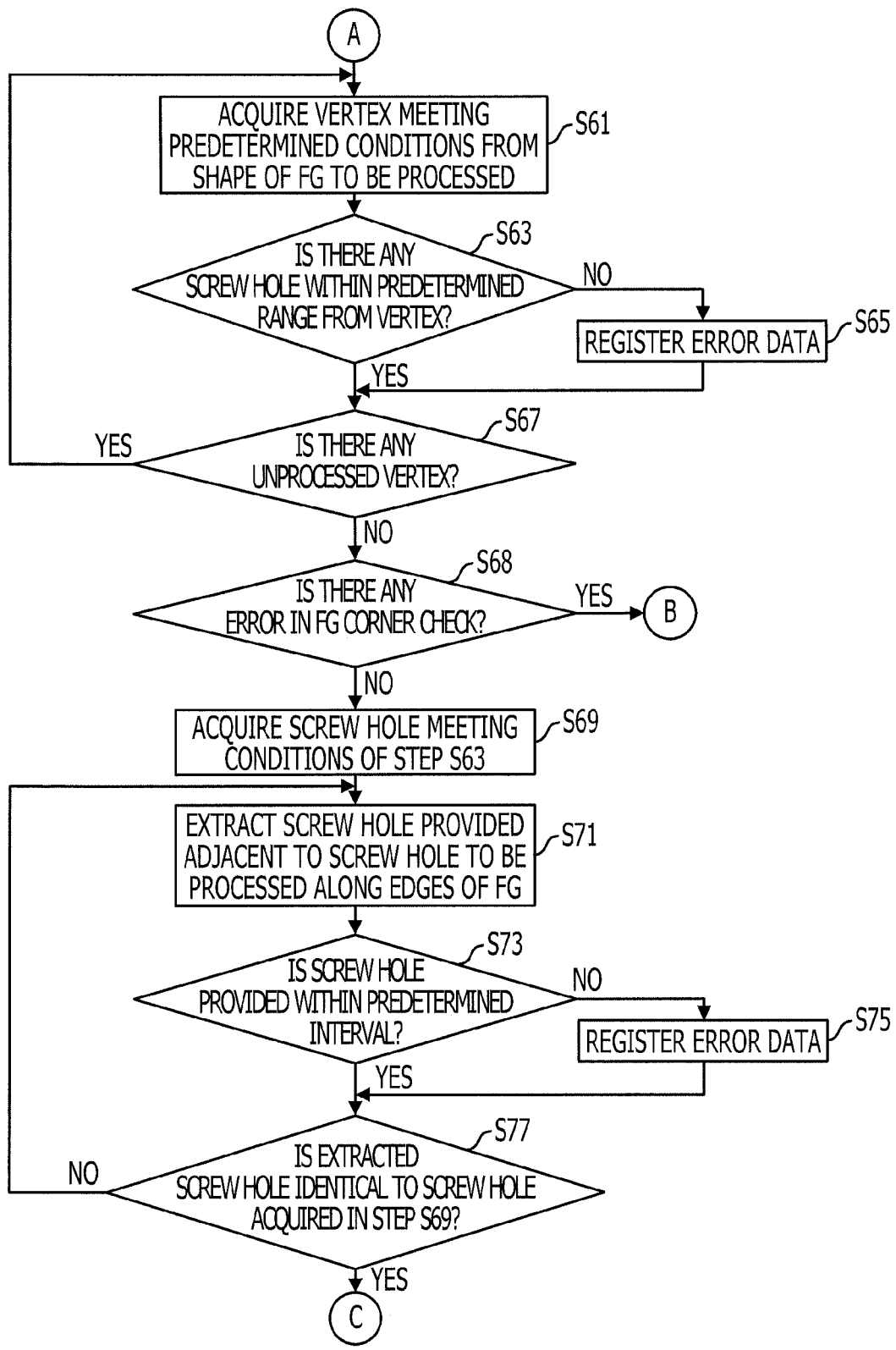
FIG. 17 illustrates an error determination process.

Proceeding to the description of the process in FIG. 17, the error determination section 111 acquires one unprocessed vertex that meets predetermined conditions from the vertexes forming the FRAME GROUND to be processed (step S61). Here, two adjacent sides are first selected from the sides forming the FRAME GROUND. In the case where the angle between the two sides is included in a range of angle judged as a corner of a FRAME GROUND, the intersection point of the two sides is acquired as the vertex to be processed. An initial value or a user set value of the range of angle judged as a corner of a FRAME GROUND is stored in advance in the condition storage section 105, and acquired in step S41, for example. Here, the range of angle judged as a corner of a FRAME GROUND is set to a range excluding 175.0 degrees to 185.0 degrees. Coordinate data indicating the acquired vertex are stored in the data storage section 109.

In the case where the angle between two adjacent sides is within a predetermined range, the two sides may be treated as a single side. For example, in the case where the angle between the two sides is equal to or more than 179.0 degrees and equal to or less than 181.0 degrees, both end points of the two sides are connected. In the case where two sides in such a relationship appear successively, the sides as a whole may be treated as a single side. It may be judged whether the angle between two adjacent sides is within a predetermined range in the case where at least one of the two sides has a predetermined length or more. For example, it is judged whether the angle between two sides is in the range excluding 175.0 degrees to 185.0 degrees discussed above in the case where at least one of the two sides has a length of 35 mm or more. Locations for error determination can be narrowed by additionally imposing these conditions in the case where the arc-like shape discussed above is to be processed. Initial values or user set values of the example parameters may be stored in advance in the condition storage section 105, and may be acquired in step S41.

Figure 18:
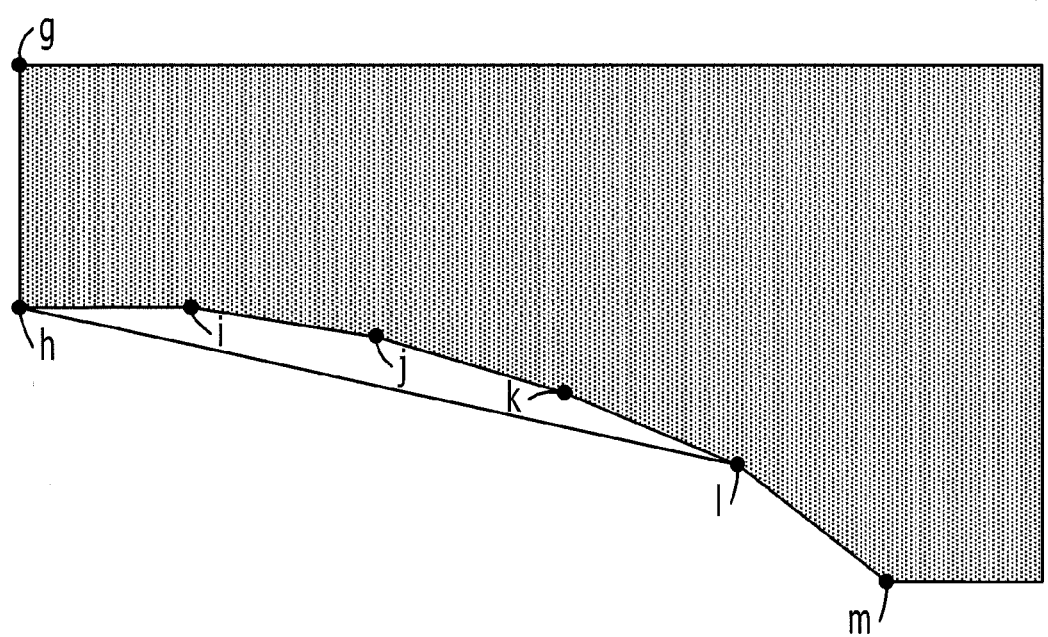
FIG. 18 illustrates a process for acquiring vertexes.

This step will be specifically described with reference to FIG. 18. In FIG. 18, the angles between side hi and side ij, between side ij and side jk, and between side jk and side kl are each equal to or more than 179.0 degrees and equal to or less than 181.0 degrees. In this case, these sides are treated as side hl. Side hl has a length of 35 mm or more. In this case, it is judged whether or not each of the angles between side gh and side hi and between side kl and side lm is within the range of angle judged as a corner of a FRAME GROUND. The angle between side gh and side hi is outside the range of 175.0 degrees to 185.0 degrees, and the angle between side kl and side lm is within the range of 175.0 degrees to 185.0 degrees. In this case, vertex h is acquired in this step, and vertex l is not acquired in this step.

Figure 19A:
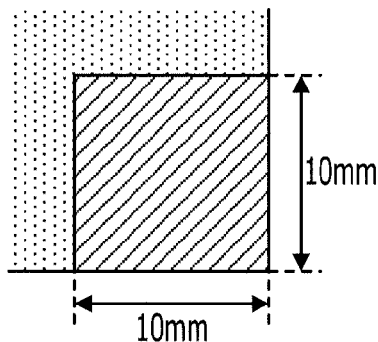
FIGS. 19A to 19D illustrate a predetermined range in which a screw hole should be present.
Figure 19B:
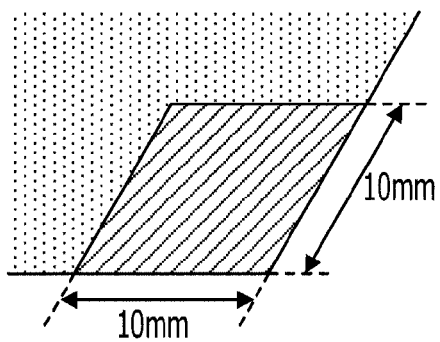

Next, the error determination section 111 judges whether there is any screw hole within a predetermined range from the vertex to be processed (step S63). First, in step S41, a parameter for specifying the range from a corner of a FRAME GROUND to a screw hole that should be provided has been acquired from the condition storage section 105. Here, the parameter is set to 10.0 mm. FIGS. 19A to 19D illustrate the predetermined range in this step. For example, as illustrated in FIGS. 19A and 19B, a rhombus (or square) range defined by two sides extending over 10.0 mm from the vertex to be processed in directions along two sides forming the FRAME GROUND and two sides extending over 10.0 mm in parallel with the two 10.0 mm-long sides and provided inside the FRAME GROUND is used as the predetermined range. Then, it is judged in this step whether there is any screw hole in such a predetermined range.

Figure 19C:
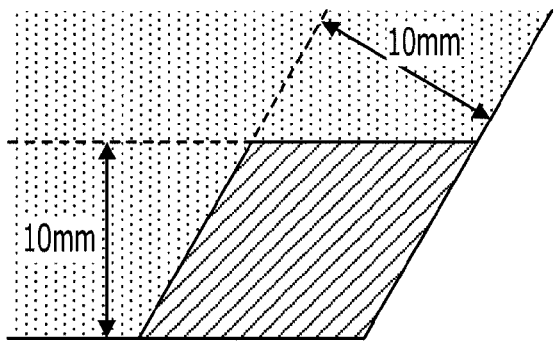
Figure 19D:
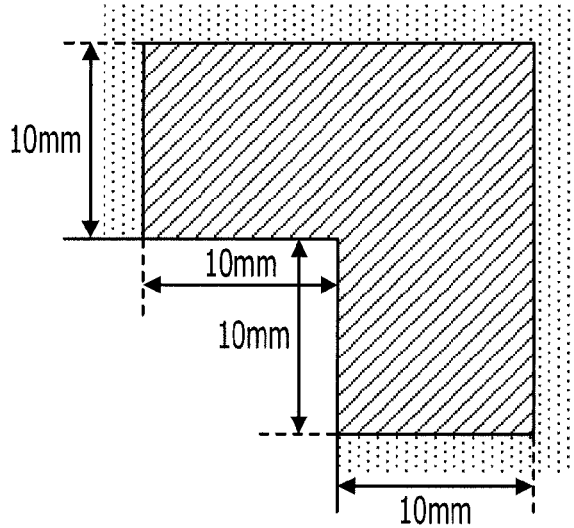

Alternatively, as illustrated in FIG. 19C, for example, a rhombus range defined by two sides forming the FRAME GROUND and two sides provided opposite the two sides forming the FRAME GROUND and at a distance of 10.0 mm from the two sides forming the FRAME GROUND may be used as the predetermined range. In the case where the angle between two sides forming the FRAME GROUND is more than 180 degrees, as illustrated in FIG. 19D, for example, a hook-shaped range surrounded by two sides extending over 10.0 mm from the vertex in directions along the two sides forming the FRAME GROUND, lines passing through end points of the two sides to extend perpendicularly to the two sides, and lines extending in parallel with the two sides forming the FRAME GROUND and provided inside the FRAME GROUND and at a distance of 10.0 mm from the two sides forming the FRAME GROUND may be used as the predetermined range. Further, a region provided inside the FRAME GROUND and within a predetermined distance from the intersection point of two sides forming the FRAME GROUND may be used as the predetermined range.

Then, it is judged whether there is any screw hole that meets a condition that a region having the same center as the center of the screw hole and having a radius obtained by multiplying the radius of the screw hole by a predetermined number overlaps the predetermined range. The condition for a screw hole and the judgment as to whether or not a region having the same center as the center of the screw hole and having a radius obtained by multiplying the radius of the screw hole by a predetermined number overlaps a certain region are the same as in step S15. In the case where there is any screw hole that meets the condition of this step, coordinate data for specifying the screw hole are stored in the data storage section 109 in correlation with the vertex to be processed. In the case where there is a plurality of screw holes that meet the condition of this step, coordinate data on one screw hole, the center of which is the closest to the vertex to be processed, may be stored, for example.

ESD noise tends to flow through the edges of the FRAME GROUND. Thus, a strong electric field tends be produced at the corners of the FRAME GROUND, even if the internal angle of the corners is not judged as an error in step S47. ESD noise can be easily dissipated to the housing via a screw by providing a screw hole at the corners of the FRAME GROUND as discussed above. Therefore, a corner of the FRAME GROUND, within the predetermined range from which there is no screw hole, is specified in this step. Even in the case where a screw hole is provided partially or wholly outside the predetermined range, for example, the head portion of a screw provided in the screw hole contacts the predetermined range if a region having the same center as the center of the screw hole and having a radius obtained by multiplying the radius of the screw hole by a predetermined number overlaps the predetermined range. Therefore, ESD noise can be dissipated via the screw.

Figure 20:
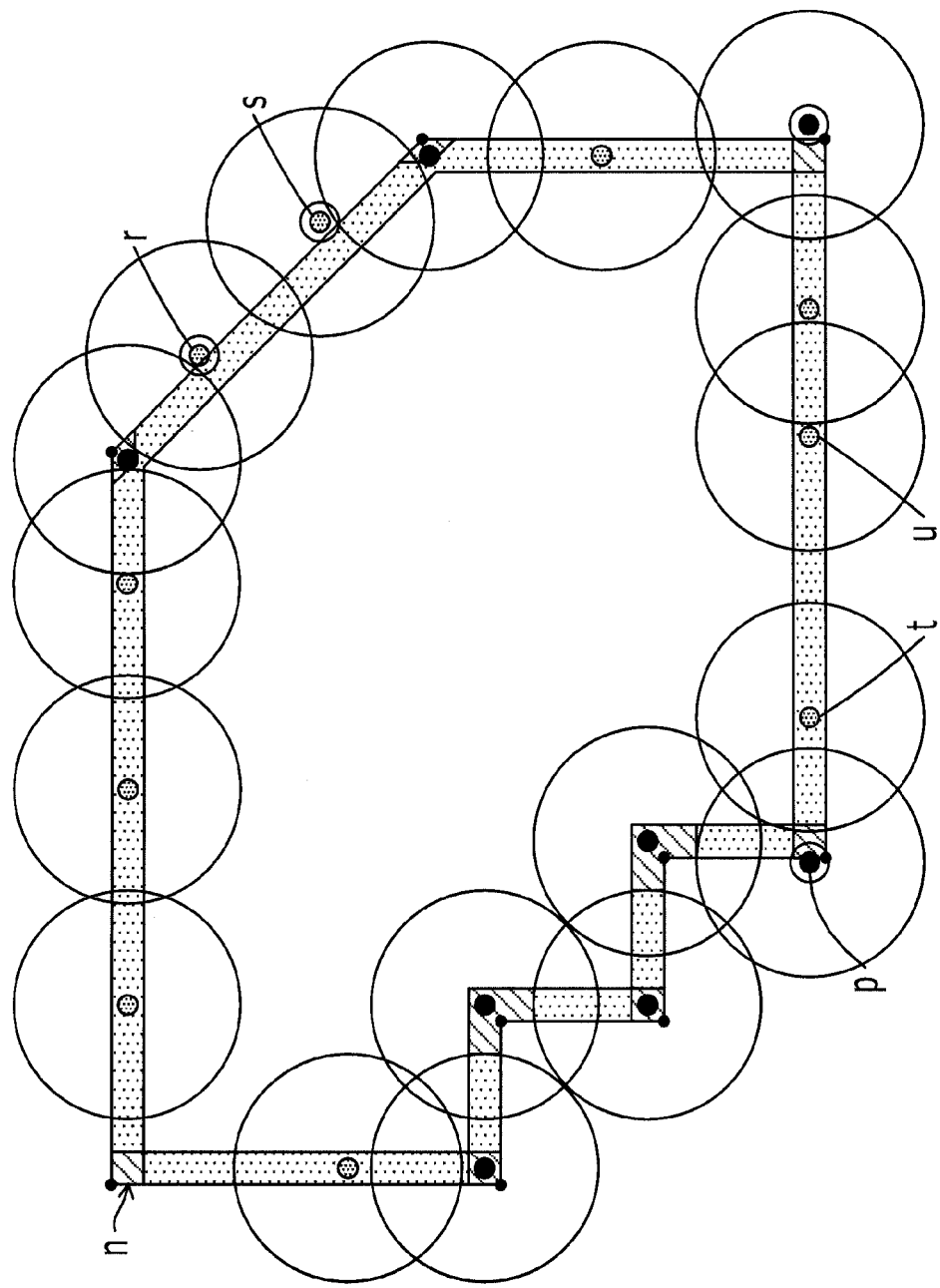
FIG. 20 illustrates a check of corners and edges of a FRAME GROUND.

This step will be specifically described with reference to FIG. 20. In FIG. 20, outside surrounding lines indicate the outer shape of the FRAME GROUND. Small black circles each indicate a vertex to be acquired in step S61. Hatched ranges each indicate a predetermined range in which a screw hole should be provided. Large black circles each indicate a screw hole provided within the predetermined range from the vertex to be acquired in step S61. Because there is no screw hole in hatched range n at the upper left of FIG. 20, it is judged that there is no screw hole that meets the condition of this step in hatched range n. Screw hole p is provided partially outside the predetermined range, and screw hole q is provided wholly outside the predetermined range. Because a region having the same center as the center of each of the screw holes and having a radius obtained by multiplying the radius of each of the screw holes by 1.4 overlaps the predetermined range, however, it is judged that each of screw holes p and q meets the condition of this step.

In the case where there is no screw hole within the predetermined range from the vertex to be processed, the error determination section 111 registers error data in the determination result storage section 113 (step S65). Here, layer information for specifying the layer in which the FRAME GROUND to be processed is provided, the coordinates for specifying the vertex to be processed, and the error category are stored, for example. For the error category, data such as "FRAME GROUND corner check" are registered, for example. Coordinate data indicating a range in which a screw hole should be provided or the like may alternatively be stored.

In the case where there is any screw hole within the predetermined range from the vertex to be processed, or after step S65, the error determination section 111 judges whether there is any unprocessed vertex that meets the conditions of step S61 in the FRAME GROUND to be processed (step S67). In the case where there is any unprocessed vertex, the process returns to step S61.

In the case where there is no unprocessed vertex, on the other hand, the error determination section 111 searches the determination result storage section 113 to judge whether there is any error related to the FRAME GROUND corner check (step S68). Here, it is judged whether there are any data with "FRAME GROUND corner check" registered in the error category field in the determination result storage section 113, for example. In the case where there is any error related to the FRAME GROUND corner check, the process proceeds to the process in FIG. 21 via a terminal B, and returns to the process in FIG. 6 after the error determination process is terminated. Because subsequent error handling is performed on the assumption that there are screw holes at the corners of the FRAME GROUND, a preliminary correction is promoted here.

In the case where there is no error related to the FRAME GROUND corner check, the error determination section 111 acquires one unprocessed screw hole from the screw holes registered in the data storage section 109 in step S63 (step S69).

Next, the error determination section 111 performs a search along the sides forming the FRAME GROUND to extract a screw hole provided adjacent to the screw hole to be processed (step S71). First, a belt-like range between sides extending in parallel with the sides forming the FRAME GROUND and provided inside the FRAME GROUND and at a distance of 10.0 mm from the sides forming the FRAME GROUND and the sides forming the FRAME GROUND is set as the predetermined range. An interval of 70.0 mm, for example, is set as a predetermined interval. Initial values or user set values of the predetermined range and the predetermined interval may be stored in advance in the condition storage section 105, and may be acquired in step S41. The value of the distance parameter used in this step, which is 10.0 mm in the example, may be the same as or different from the value of the parameter for specifying the range in which a screw hole should be provided from a corner of a FRAME GROUND used in step S63.

Then, a search is performed in either direction along the sides forming the FRAME GROUND, for example, to extract a nearby screw hole that meets the condition that a region having the same center as the center of the screw hole and having a radius obtained by multiplying the radius of the screw hole by a predetermined number overlaps the predetermined range. It is also confirmed that the interval between the extracted screw hole and the screw hole to be processed is 70.0 mm or less.

As discussed above, ESD noise tends to flow through the edges of the FRAME GROUND. Thus, ESD noise can be easily dissipated to the housing via a screw by providing a screw hole along the edges of the FRAME GROUND. Therefore, in this step, it is confirmed that screw holes are provided at predetermined intervals along the edges of the FRAME GROUND. Even in the case where a screw hole is provided partially or wholly outside the predetermined range, such a screw hole is treated as meeting the conditions of this step if a region having the same center as the center of the screw hole and having a radius obtained by multiplying the radius of the screw hole by a predetermined number overlaps the predetermined range, as in steps S15 and S63.

In FIG. 20, a belt-like range between outside surrounding lines and inside surrounding lines indicates the predetermined range in this step. Large black circles each indicate a screw hole that meets the conditions of step S63, and gray circles each indicate a screw hole extracted in step S71. Screw hole r is provided partially outside the predetermined range, and screw hole s is provided wholly outside the predetermined range. Because a region having the same center as the center of each of the screw holes and having a radius obtained by multiplying the radius of each of the screw holes by 1.4 overlaps the predetermined range, however, it is judged that each of screw holes r and s meets the condition of this step. In this step, it is judged whether the centers of such screw holes are provided continuously at intervals of 70.0 mm or less. In FIG. 20, a circle with a radius of 35.0 mm is illustrated around each of the screw holes for the purpose of illustration. That is, it is judged in this step that the interval between screw holes is more than 70.0 mm at a portion not covered by the circles. Specifically, it is judged that the interval between screw hole t and screw hole u is more than 70.0 mm.

Then, the error determination section 111 judges whether the screw hole extracted in step S71 is provided within the predetermined interval (step S73). In the case where the screw hole is not provided within the predetermined interval, the error determination section 111 registers error data in the determination result storage section 113 (step S75). Here, layer information for specifying the layer in which the FRAME GROUND to be processed is provided, information for specifying the portion judged as an error, and the error category are stored, for example. For the error category, data such as "FRAME GROUND edge check" are registered, for example. For the information for specifying the portion judged as an error, the center coordinates of the two screw holes judged to be located away from each other by more than the predetermined interval are registered, for example. Coordinates for specifying a range in which a screw hole should be provided or the like may alternatively be registered.

In the case where the screw hole extracted in step S71 is provided within the predetermined interval, on the other hand, or after step S75, the error determination section 111 judges whether the extracted screw hole is identical to the screw hole acquired in step S69 (step S77). In steps S71 to S77, searches for a screw hole are performed along the sides forming the FRAME GROUND around the FRAME GROUND, and the process is repeated until the screw hole to be processed initially set in step S69 is extracted. In the case where the extracted screw hole is different from the screw hole acquired in step S69, the screw hole extracted in step S71 is set as a new screw hole to be processed, and the process returns to step S71. In the case where the extracted screw hole is identical to the screw hole acquired in step S69, on the other hand, the process proceeds to FIG. 21 via a terminal C.

Figure 21:
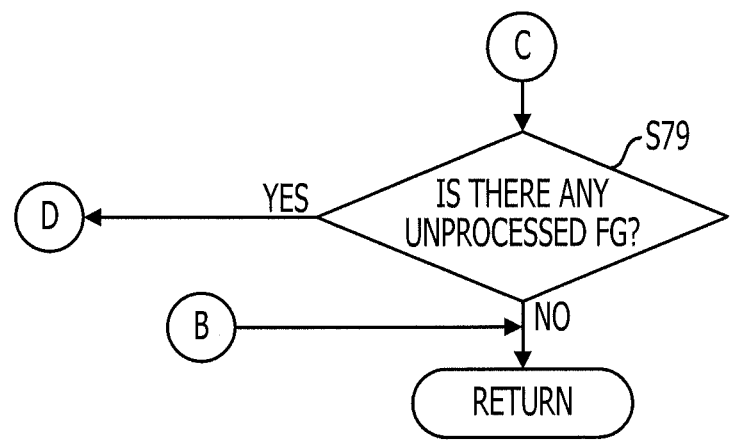
FIG. 21 illustrates an error determination process.

Proceeding to the process in FIG. 21, the error determination section 111 judges whether there is any unprocessed FRAME GROUND in the data storage section 109 (step S79). In the case where there is any unprocessed FRAME GROUND, the process returns to step S43 via a terminal D. In the case where there is no unprocessed FRAME GROUND, on the other hand, the error determination process is terminated to return to the process in FIG. 6.

Returning to the description of the process in FIG. 6, the output section 117 outputs error information using data stored in the design data storage section 101, the determination result storage section 113, and the correction method storage section 115 (step S5). Here, the output section 117 generates a list for presenting to the user the error information stored in the determination result storage section 113, for example, to output the generated list. An error correction method associated with the error category is stored in advance in the correction method storage section 115. Examples of the error correction method are as follows. For "internal angle check", a message indicating that a correction should be made to eliminate any pointed portion at which the internal angle of the FRAME GROUND is a predetermined angle or less has been registered. Likewise, for "gap check", a message indicating that a correction should be made to increase the distance between the FRAME GROUND and the signal pattern to be more than a predetermined distance. For "FRAME GROUND corner check", a message indicating that a correction should be made to provide a screw hole within a predetermined range from the corners of the FRAME GROUND. For "FRAME GROUND edge check", a message indicating that a correction should be made to provide screw holes at predetermined intervals along the edges of the FRAME GROUND.

Here, the output section 117 acquires information for displaying the circuit configuration around the location of the error from the tables stored in the design data storage section 101 on the basis of the coordinate data and the layer information indicating the location of the error registered in the determination result storage section 113 to output an enlarged view around the location of the error, for example. Also, the output section 117 acquires a correction method from the correction method storage section 115 on the basis of the error category registered in the determination result storage section 113 to output the acquired correction method. Specific numerical values of the angle or the distance for the location judged as an error may be held in the error determination process so that a message such as "Only Y mm away; should be X mm away" can be output in this step. The output section 117 may suggest a possible effect of the location judged as an error. Rather than outputting a list of the error information, the error information may be displayed sequentially so that the user can correct the design data through a dialog. The output may be made to the user, and further the user may be allowed to correct the design data, at the timing when error data are registered in the error determination process.

In the case where the user has corrected the design data, the printed circuit board design assisting device performs the process again in response to an instruction from the user or automatically, for example. The error determination process is preferably performed all through because a correction may resolve one error and cause another error at the same time. In the case where it is judged in step S68 that there is any error in the FRAME GROUND corner check, the error determination process etc. is performed after the design data are corrected. At this time, the process may be resumed at step S61, for example.

In the embodiment, the FRAME GROUND edge check in steps S69 to S77 is performed in the case where there is no error in the FRAME GROUND corner check in steps S61 to S67. However, the FRAME GROUND edge check may be performed without terminating the process in step S68. In this case, a screw hole is acquired in step S69 from the predetermined range in step S71, for example, so that the FRAME GROUND edge check is performed independently of the FRAME GROUND corner check.

In the FRAME GROUND edge check, a plurality of screw holes that meet the conditions of step S63 may be first acquired, and it may then be confirmed that screw holes are provided at predetermined intervals between the acquired screw holes.

By performing the process described above, a location that may be problematic in terms of ESD tolerance can be specified from design data on a printed circuit board. That is, a ground pattern to which the designer of the printed circuit board should pay attention from the viewpoint of ESD measures can be extracted.

While an embodiment of the present technology has been described above, the present technology is not limited thereto. For example, the functional block diagram is merely exemplary, and does not necessarily coincide with the actual program module configuration. In addition, the steps in the process may be performed in a different order or in parallel with each other unless the results of the process are changed. Further, the tables of the design data illustrated in FIGS. 3 to 5 are also exemplary, and may include different data items.

Figure 22:
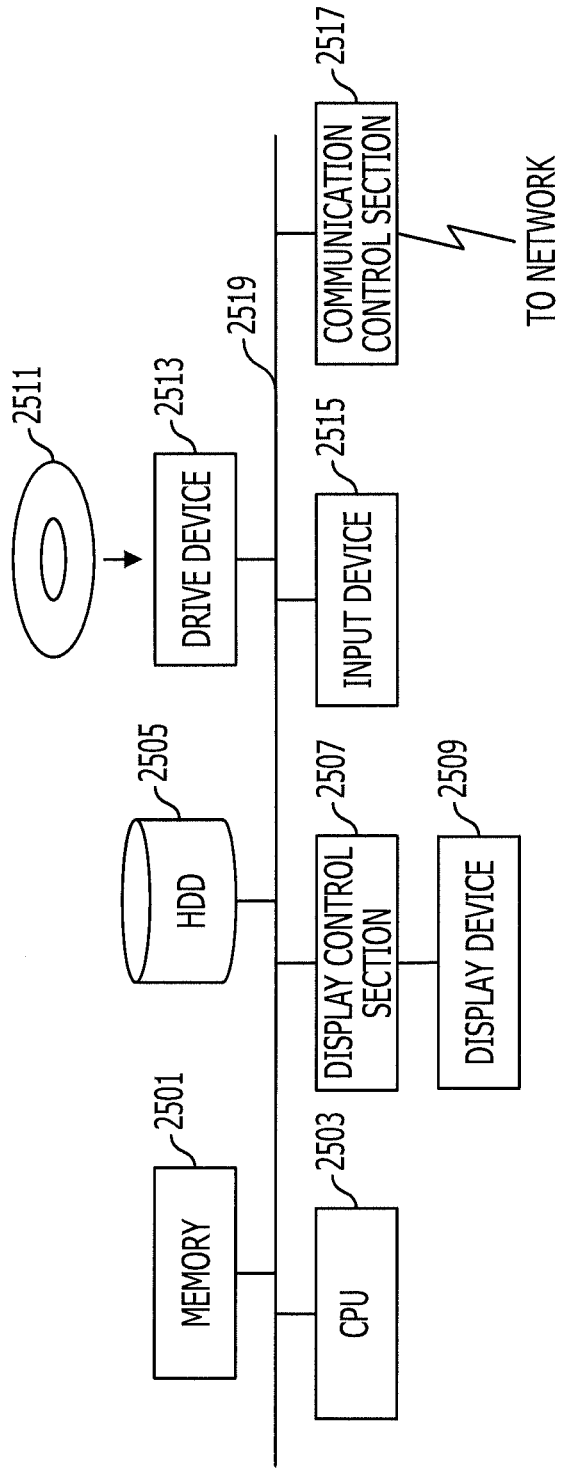
FIG. 22 is a functional block diagram of a computer that implements the embodiment.

The printed circuit board design assisting device discussed above is implemented by a computer device including, as illustrated in FIG. 22, a memory 2501, a CPU 2503, a hard disk drive (HDD) 2505, a display control section 2507 connected to a display device 2509, a drive device 2513 for a removable disk 2511, an input device 2515, and a communication control section 2517 for connection to a network. The components of the computer device are connected to each other via a bus 2519. An Operating System (OS) and an application program for performing the process according to the embodiment are stored in the HDD 2505, and are read from the HDD 2505 into the memory 2501 to be executed by the CPU 2503. The CPU 2503 controls the display control section 2507, the communication control section 2517, and the drive device 2513 in accordance with the content of the process of the application program to cause the display control section 2507, the communication control section 2517, and the drive device 2513 to perform a predetermined operation. Data that are being processed are mainly stored in the memory 2501, but may be stored in the HDD 2505. In the embodiment of the present technology, the application program for performing the process discussed above is distributed in the removable disk 2511, which is computer-readable, to be installed on the HDD 2505 from the drive device 2513.

The application program may also be installed on the HDD 2505 via a network such as the Internet and the communication control section 2517. Such a computer device achieves the variety of functions discussed above through organic cooperation of hardware such as the CPU 2503 and the memory 2501 and programs such as the OS and the application program.

Figure 23:
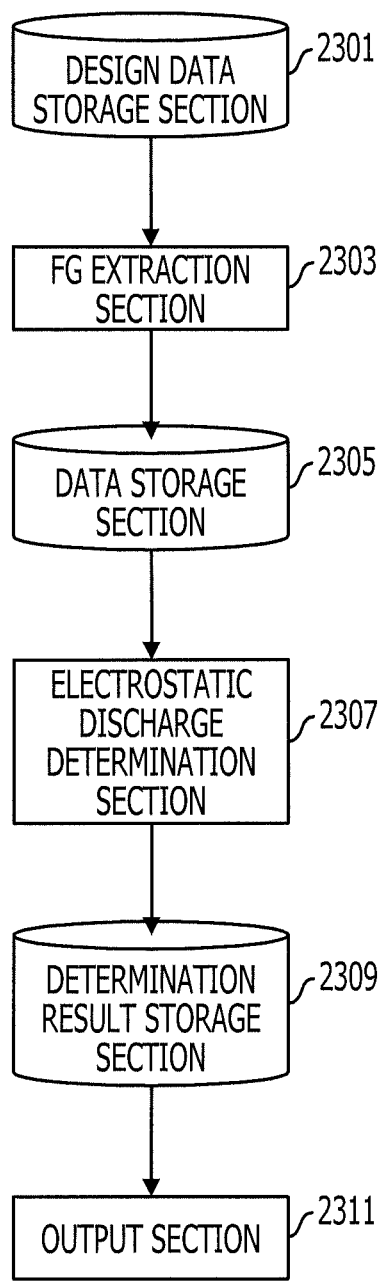
FIG. 23 is a functional block diagram of a printed circuit board design assisting device.

The printed circuit board design assisting device according to the embodiment includes: (A) a frame ground (FRAME GROUND) extraction section (FIG. 23: 2303) that extracts a ground pattern that is provided in a surface layer of a printed circuit board and that is to be connected to a metal component from design data on the printed circuit board stored in a design data storage section (FIG. 23: 2301) to store information for specifying the ground pattern in a data storage section (FIG. 23: 2305); (B) an electrostatic discharge determination section (FIG. 23: 2307) that performs a determination as to electrostatic discharge for the ground pattern specified from the information stored in the data storage section to store a determination result in a determination result storage section (FIG. 23: 2309); and (C) an output section (FIG. 23: 2311) that outputs the determination result stored in the determination result storage section.

An electrostatic voltage may be applied to a metal component exposed to the outside of a device, and ESD noise may flow through a ground pattern connected to such a metal component. A ground pattern connected to a metal component may serve as a path for dissipating ESD noise to a housing via the metal component. In a multi-layer circuit board, in particular, ESD noise propagates via a surface layer, and therefore a ground pattern in the surface layer is important in terms of ESD measures. Thus, a ground pattern to which a designer should pay attention for ESD measures can be presented by performing a determination as to electrostatic discharge for the ground pattern discussed above.

The electrostatic discharge determination section discussed above may determine that the ground pattern has an abnormality in the case where the ground pattern has an internal angle that is a predetermined angle or less. A strong electric field tends to be produced at a pointed portion in the ground pattern, which may cause a dielectric breakdown. Such a problematic portion can be determined as an abnormality by performing the determination discussed above.

The electrostatic discharge determination section discussed above may determine that the ground pattern or a signal pattern has an abnormality in the case where the signal pattern is provided in the same layer as the ground pattern and within a predetermined distance from the ground pattern. ESD noise flowing through the ground pattern may be coupled to the signal pattern depending on the distance between the ground pattern and the signal pattern. Such a problematic portion can be determined as an abnormality by performing the determination discussed above.

The electrostatic discharge determination section may determine that the ground pattern has an abnormality in the case where there is a portion in which screw holes arranged along edges of the ground pattern and directly or indirectly connected to the ground pattern are spaced at intervals of a predetermined length or more. More specifically, the electrostatic discharge determination section may determine that the ground pattern has an abnormality in the case where there is any portion in which screw holes that are arranged along edges of the ground pattern and that contact a predetermined range inside the ground pattern and screw holes for screws that contact the predetermined range when the screws are fastened are spaced at intervals of a predetermined length or more. ESD noise can be dissipated to a housing by connecting the ground pattern to the housing via the screws. ESD noise tends to flow through the edges of the ground pattern. Thus, ESD noise can be easily dissipated to the housing by providing screw holes along the edges of the ground pattern at intervals less than the predetermined length. Thus, a location that may need a correction can be specified by performing the determination discussed above.

The electrostatic discharge determination section may determine that the ground pattern has an abnormality in the case where an angle between two adjacent sides defining edges of the ground pattern is an angle within a second predetermined range and there is no screw hole directly or indirectly connected to a region inside the ground pattern prescribed on the basis of an intersection point of the two adjacent sides. More specifically, the electrostatic discharge determination section may determine that the ground pattern has an abnormality in the case where an angle between two adjacent sides defining edges of the ground pattern is an angle within a second predetermined range and there is no screw hole that contacts a region inside the ground pattern prescribed on the basis of an intersection point of the two adjacent sides or no screw hole for a screw that contacts the region when the screw is fastened. ESD noise tends to flow through the edges of the ground pattern. A strong electric field may be produced at such an intersection point of the two sides as with the pointed portion discussed above. ESD noise can be easily dissipated to the housing if there is a screw hole connected to the region prescribed on the basis of the intersection point. Thus, a location that may need a correction can be specified by performing the determination discussed above.

The electrostatic discharge determination section may determine that the ground pattern has an abnormality in the case where at least one of the two adjacent sides has a second predetermined length or more. The number of intersection points of two sides discussed above may be excessive in the case where an arc-like shape is formed by short adjacent sides, for example. Intersection points for determination can be narrowed by additionally imposing a condition that at least one side has a predetermined length or more.

The frame ground extraction section may extract the ground pattern provided in the surface layer of the circuit board in the case where a region having the same center as a center of a screw hole and obtained by multiplying a radius of the hole by a predetermined number is provided inside the ground pattern or a hole for connection of a lead pin of a spring connector is at least partially provided inside the ground pattern. If a region obtained by multiplying the radius of a screw hole by a predetermined number is provided inside the ground pattern, it is considered that the ground pattern is to contact the head portion of a screw, a washer, or the like to be connected to the housing via the screw, a spacer, or the like. In the case where the ground pattern and the spring connector are to be connected to each other, meanwhile, it is considered that the ground pattern is to be connected to the housing via the spring connector. That is, such a ground pattern functions as a frame ground, and may serve as a path for propagating ESD noise. Such a ground pattern can be extracted in the manner discussed above.

The electrostatic discharge determination section may store information for specifying a location determined to have an abnormality in the determination result storage section, and the output section may output the information for specifying the location determined to have an abnormality stored in the determination result storage section. This allows the user to specify the location determined to have an abnormality.

The electrostatic discharge determination section may further store information for identifying a category of the abnormality in the determination result storage section, and the output section may further read, from a correction method storage section that stores data on a correction method associated with the information for identifying the category of the abnormality, data on the correction method in accordance with the information for identifying the category of the abnormality stored in the determination result storage section to output the read data on the correction method. This allows presenting how the design data may be corrected to the user.

Figure 24:
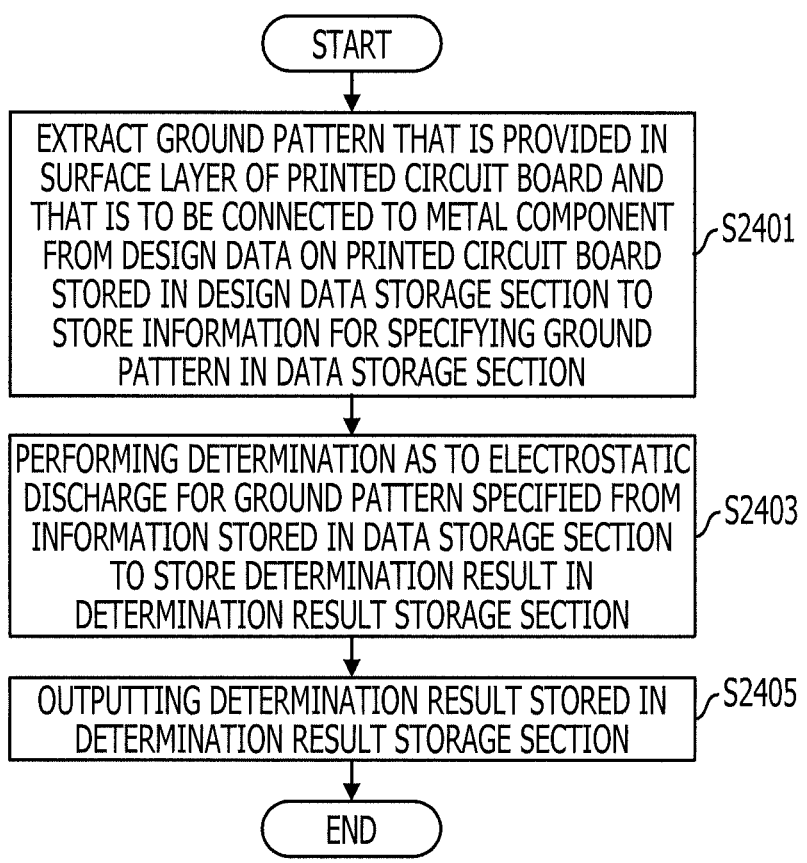
FIG. 24 illustrates processes of a printed circuit board design assisting method.

The printed circuit board design assisting method according to the embodiment includes: (A) extracting a ground pattern that is provided in a surface layer of a printed circuit board and that is to be connected to a metal component from design data on the printed circuit board stored in a design data storage section to store information for specifying the ground pattern in a data storage section (FIG. 24: 2401); (B) performing a determination as to electrostatic discharge for the ground pattern specified from the information stored in the data storage section to store a determination result in a determination result storage section (FIG. 24: 2403); and (C) outputting the determination result stored in the determination result storage section (FIG. 24: 2405).

A program for causing a computer to perform processes according to the above method can be prepared. The program is stored in a computer-readable storage medium or storage device such as a flexible disk, a CD-ROM, a magneto-optical disk, a semiconductor memory, or a hard disk, for example. Intermediate process results are temporarily stored in a storage device such as a main memory.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present inventions have been described in detail, it should be understood that various changes, substitutions, and alterations could be made hereto without departing from the spirit and scope of the invention.

The invention claimed is:

1. A printed circuit board design assisting device comprising:
   a processor to execute:
   extracting a ground pattern, which is provided in a surface layer of a printed circuit board and that is to be connected to a metal component, from design data on the printed circuit board stored in a design data storage to store information to specify the ground pattern in a data storage;
   determining electrostatic discharge for the ground pattern specified from the information stored in the data storage and storing a determination result in a determination result storage, the determination result identifying an abnormality corresponding with the electrostatic discharge and a location of the abnormality;
   outputting the determination result stored in the determination result storage section; and
   outputting an error display dialog based on the determination result.

2. The printed circuit board design assisting device according to claim 1,
   wherein the determining determines that the ground pattern has an abnormality when the ground pattern has an internal angle that measures less than a predetermined amount.

3. The printed circuit board design assisting device according to claim 1,
   wherein the determining determines that the ground pattern or a signal pattern has an abnormality when the signal pattern is provided in the same layer as the ground pattern and is located within a predetermined distance from the ground pattern.

4. The printed circuit board design assisting device according to claim 1,
   wherein the determining determines that the ground pattern has an abnormality when any portion in which screw holes arranged along edges of the ground pattern and directly or indirectly connected to the ground pattern are spaced at intervals of a predetermined length or more.

5. The printed circuit board design assisting device according to claim 1,
   wherein the determining determines that the ground pattern has an abnormality when an angle between two adjacent sides defining edges of the ground pattern is an angle within a predetermined range and there is no screw hole directly or indirectly connected to a region inside the ground pattern prescribed on the basis of an intersection point of the two adjacent sides.

6. The printed circuit board design assisting device according to claim 5,
   wherein the determining determines that the ground pattern has an abnormality when at least one of the two adjacent sides has a second predetermined length or more.

7. The printed circuit board design assisting device according to claim 1,
   wherein the extracting extracts the ground pattern provided in the surface layer of the circuit board when a region having a same center as a center of a screw hole and obtained by multiplying a radius of the hole by a predetermined number is provided inside the ground pattern or a hole for connection of a lead pin of a spring connector is at least partially provided inside the ground pattern.

8. The printed circuit board design assisting device according to claim 1,
   wherein the determining stores information to specify a location determined to have an abnormality in the determination result storage, and the outputting outputs the information to specify the location determined to have an abnormality stored in the determination result storage.

9. The printed circuit board design assisting device according to claim 8,
wherein the determining stores information to identify a category of the abnormality in the determination result storage, and the outputting reads, from a correction method storage section that stores data on a correction method associated with the information to identify the category of the abnormality, data on the correction method in accordance with the information to identify the category of the abnormality stored in the determination result storage to output the read data on the correction method.

10. A printed circuit board design assisting method executable by a computer, the method comprising:
   extracting a ground pattern, which is provided in a surface layer of a printed circuit board and that is to be connected to a metal component, from design data on the printed circuit board stored in a storage of the computer;
   storing information to specify the ground pattern in the storage of the computer;
   determining electrostatic discharge for the ground pattern specified from the information stored in the storage of the computer;
   storing a determination result in the storage of the computer, the determination result identifying an abnormality corresponding with the electrostatic discharge and a location of the abnormality;
   outputting the determination result; and
   outputting an error display dialog based on the determination result.

11. A non-transitory computer-readable medium storing a printed circuit board design assisting program, which when executed by a computer, causes the computer to execute a process comprising:
   extracting a ground pattern, which is provided in a surface layer of a printed circuit board and that is to be connected to a metal component, from design data on the printed circuit board stored in a storage;
   storing information to specify the ground pattern in a storage;
   determining electrostatic discharge for the ground pattern specified from the information stored;
   storing a determination result in a storage, the determination result identifying an abnormality corresponding with the electrostatic discharge and a location of the abnormality;
   outputting the determination result; and
   outputting an error display dialog based on the determination result.

* * * * *